United States Patent [19]

Sutton et al.

[11] Patent Number: 4,994,100

[45] Date of Patent: Feb. 19, 1991

[54] HOMOGENEOUS GRANULAR NITROGEN FERTILIZER

[75] Inventors: Allen R. Sutton, Corydon, Ky.; Charles W. Weston, Prarieville, La.; Richard L. Balser, Tulsa, Okla.

[73] Assignee: Freeport McMoRan Resource Partners, New Orleans, La.

[21] Appl. No.: 292,004

[22] Filed: Dec. 29, 1988

[51] Int. Cl.$^5$ .............................................. C05C 9/00
[52] U.S. Cl. ......................................... 71/30; 71/28; 71/29; 71/64.05; 71/64.13
[58] Field of Search ...................................... 71/28–30, 71/64.05, 64.06, 64.07, 64.13

[56] References Cited

FOREIGN PATENT DOCUMENTS 3714729 11/1988 Fed. Rep. of Germany .

OTHER PUBLICATIONS

CA 11(1):64835, Synergistic . . . Dicyanodiamide, 11/10/88, Solansky et al.
CA 108(5):36742f, Effect of . . . Soils, 1987, Efimov et al.
CA 108(25):220840n, Effect of Ammonium . . . Soils, 1987, Fairlie.
CA 108(11):93576d, Nitrification . . . Temperature, 1987, Singh et al.
CA 74(16):77917g, Stabilized Ammonium Thiosulfate, 1971, Strieu.
Article by R. J. Goos and B. E. Johnson "Combining Nitrification Inhibitor Technologies", pp. 83–88. Proceedings of the 19th North Central Extension Industry Soil Fertility Conference, 1989.
Reference by D. W. Reeves and J. T. Touchton, "Division S-8- Fertilizer Technology and Use" pp. 1353–1357, Soil. Sci. Soc. Am. 2, vol. 50, 1987.
Abstract of the Dec. 1985 issue of Agronomic Abstracts, Use of Dicyandiamide as a Nitrification Inhibitor in Direct Seeded Rice Cultures.
Roland D. Hauck, Argicultural Research Branch, National Fertilizer Dev. Ctr. Nitrification, Its Inhibition & Immobilization/Mineralization Processes in Soil.
Nickel: An Essential Micronutrient for Legumes and Possibly All Higher Plants Science, vol. 222, p. 622.
Identification of Ammonium Thiosulfate as a Nitrification and Urease Inhibitor; Soil Science Society of America Journal, vol. 49, No. 1, Jan.-Feb. 1985, R. J. Goos.
The Nitrogen with a Better N Result (pamphlet), Agrico, Division of Freeport-McMoRan Resource Partners.
Super N Goes to Market (article) Feature p. 12.
Urea Hydrolysis and Ammonia Volatilization Characteristics of Liquid Fertilizer Mixtures; R. J. Goos; Journal of Fertilizer Issues Jun. 1985, pp. 38–41.
A Study of Anticaking Treatments for Urea, by G. M. Boluin and A. W. Allen American Chemical Society presentation at annual meeting held Sep. 9–12, 1985.
Abstract of the Dec. 1985 issue of Agronomic Abstracts, Effect of Phosphoroamite as Urease Inhibitors in Field Trails with Corn.
Solubilities and Stabilities of the Nitrogen Loss Inhibitors Dicyandiamide, Thiourea, and Phenyl Phosphorodiamidate in Fluid Fertilizers, J. Gautney, Y. Kim, & A. Barnard, National Fertilizer Dev. Ctr. Jul. 13, 1984.
The Agrico Super N Story (brochure) by Agrico, a division of Freeport-McMoRan Resource Partners.
National Water Summary 1984–Water Quality Issues, p. 93; Overview of the Occurrence of Nitrate in Ground Water of the United States, by Robert Madison, Jilann O. Brunett.
Agronomic and Environmental Effects of Nitrification Inhibitor Use; by G. L. Malzer, Soil Science Department, University of Minnesota.
Abstract of U.S. Pat. No. 4,500,336; Process for Making Granules Containing Urea as the Main Component, Filed Jun. 18, 1982, Ser. No. 390,044, Hijfte.
American Chemical Society presentation given at the 1985 annual meeting on Laboratory and Field Evaluation of Ammonium Thiosulfate as a Nitrification and Urease Inhibitor, informal report.
United States Statutory Invention Registration, No. H25, published Feb. 4, 1986; Thiophosphoryl Triamide as a Urease Inhibitor, Robert Radel.
U.S. Pat. No. 4,500,335 from the Official Gazette dated Feb. 19, 1985; Composition of Matter and Method of Use for Nitrogen Fertilization, Lloyd B. Fenn.

Primary Examiner—Ferris H. Lander
Attorney, Agent, or Firm—Fisher, Christen & Sabol

[57] ABSTRACT

An improved aqueous nitrogen fertilizer has been developed that increases first-year nitrogen uptake efficiency to plants. It is also a nitrogen fertilizer with features to minimize exposure to nitrogen loss. It is a nitrogen fertilizer consisting of urea, dicyandiamide, ammonium thiosulfate, and optionally a phosphate compound which is preferably an ammonium phosphate compound. This composition can contain a dye and/or various mineral micronutrients. This homogeneous granular fertilizer can be applied to a field crop in a single application and is available to the growing plant throughout its growth and maturing cycle. The homogeneous granular fertilizer composition is conveniently prepared by the addition of a dicyandiamide, and a solution of ammonium thiosulfate to molten urea. A phosphate compound and preferably ammonium polyphosphate, would be added along with these components.

26 Claims, No Drawings 4,994,100

HOMOGENEOUS GRANULAR NITROGEN FERTILIZER

FIELD OF THE INVENTION

This invention relates to a nitrogen fertilizer which is a homogeneous granular solid and which delivers increased nitrogen uptake to plants after application. More particularly, this invention relates to an improved urea based nitrogen fertilizer which experiences decreased exposure to losses of nitrogen.

BACKGROUND OF THE INVENTION

Nitrogen is a necessary element in the growth and development of plant life. Some plants such as legumes can take up atmospheric nitrogen and fix nitrogen into the soil. However, most plants, and in particular many plants used to produce human and animal food, require the use of nitrogen fertilizer to supply the necessary nitrogen to the plant. Nitrogen fertilizers have been, and continue to be, applied to farm fields during the various development stages of the plants. This is the case since the plant requirement for nitrogen changes during the growth and maturation of the plant. However, even with the careful application of nitrogen fertilizers, it is estimated that only about 40% to 70 percent of the nitrogen applied as fertilizer is taken up by the crop in a given year. The remaining nitrogen content of the fertilizers to which the plants are exposed is essentially lost. This then presents the challenge of how to improve the efficiency of the nitrogen fertilizers that are applied to a crop. The two ways to approach this challenge are to enhance the nitrogen feeding mechanism and to minimize the probability of nitrogen loss.

The nitrogen feeding mechanism can be enhanced by having the nitrogen present at the right place at the right time and in the right form. That is the nitrogen should be an available form in the vicinity of the root system when there is a demand for nitrogen by the growing plant. In the past this has been accomplished by various scheduled applications of fertilizer during the growing season of the plant. Slow release fertilizers have also been used. However, these techniques have not fully solved the problem.

As an example of the problem, a corn plant has about a 115 day growing period from seed to a mature plant. The need of the corn plant for nitrogen varies during this period of time. In the first 25-day period when the plant goes from the seed stage to a small plant, the nitrogen requirement is about 19 pounds per 180 bushels of corn. During the next 25-five day period as the plant grows and adds leaf material, the nitrogen demand is for about 84 pounds of nitrogen per 180 bushels of corn. During the third 25-day period, while the plant is still growing and approaching a stage of maturity when tassel and kernel formation is initiated, the nitrogen requirement is for about 75 pounds of nitrogen per 180 bushels of corn. During fourth 25-day period when there is continued kernel development and kernel growth there is a requirement for about 48 pounds of nitrogen per 180 bushels of corn. At the point of full maturity and essentially complete cob formation and kernel growth the requirement for nitrogen during the next 15-day period is for about 14 pounds of nitrogen. Consequently, it can be seen as the corn plant grows and develops its need for nitrogen is constantly changing. However, as a rule the highest demand for nitrogen by a corn plant will be at the time of tassel formation and kernel development and growth.

Nitrogen is also necessary for the growth of turf. Turf will not have as deep a root system as corn and other food plants and it therefore presents different challenges. Because of the shallow root system and the necessity for the nitrogen to be accessible to the turf root system during root growth, it is common practice to schedule a multiple number of fertilizer applications to the turf during its growing cycle. However, this is costly in both labor and fertilizer product. It is an indication that use of the fertilizer is not being maximized. It is also an indication that the applied fertilizer has a short effective availability after application. These are problems that continue to be addressed by turf producers. This is also an area where the present homogeneous granular nitrogen fertilizer exhibits distinct advantages.

The nitrogen in nitrogen fertilizers is lost after an application in various ways. When the nitrogen is applied as urea nitrogen, there is exposure to volatilization loss of nitrogen as ammonia. There is also the possibility of denitrification loss of nitrogen. In this loss, nitrate which has been applied which has been converted by soil organisms from the ammonium ion to the nitrate ion is lost through soil bacteria taking the oxygen from the nitrate nitrogen leaving gaseous nitrogen which then escapes into the atmosphere. The other loss of nitrate is through a leaching of the nitrate downwardly to below the root level of the plant. This nitrate is lost into the lower levels of the soil table or into ground water. When this nitrate enters the groundwater it is considered to be a pollutant. Consequently it is now a further objective in the use of fertilizers to have a minimum amount of the fertilizer to leach downwardly in the soil to the groundwater.

Plants including grasses, use nitrogen in the form of ammonium nitrogen and nitrate nitrogen to form amino acids which are then polymerized into proteins. The ammonium nitrogen can be taken up directly by the root system of the plant from the soil. However, nitrate nitrogen is more readily available to the root system of the plant and is more readily taken up than ammonium nitrogen in the early stages of plant growth. When nitrate nitrogen is taken up by the plant it is converted in the plant to ammonium nitrogen, then to amino acids, and then to proteins. One reason that the nitrate ion is more readily available to the plant and is more rapidly taken up by the plant is that it has a minus charge as does the clay and humus particles in the soil. Consequently, the nitrate ion is not bound into the soil. However, since the ammonium ion has a positive charge it is attracted to the clay and humus particles and is held by these particles until bacteria can cause the conversion of the ammonium ion to nitrate ion. As the ammonium ion is converted to nitrate ion it becomes available to the plant root system and is taken up by the plant. The plant root system can also take up nitrogen in the ammonium nitrogen form. Some research shows that plants prefer the ammonium form during the critical mid-season grainfill period. It is during the periods of highest nitrogen demand by a plant that the plant needs to have sufficient nitrate nitrogen and sufficient ammonium nitrogen available in the area of the root system. Although nitrate nitrogen is rapidly take up by the root system, it is considered that for maximizing the growth of a plant, and the yield from the plant that a balance of ammonium nitrogen and nitrate nitrogen is needed during periods of rapid plant growth.

The present homogeneous granular fertilizers solve many of these problems. These granular fertilizers minimize exposure to the loss of nitrogen through volatilization as ammonia. Further there is less nitrogen prone to denitrification loss and less leaching loss of the nitrogen in the form of nitrate. This is accomplished by having a large amount of the nitrogen available as ammonium nitrogen during the early stages of application. It is during these early stages of application that the plant does not have a high requirement for nitrogen. Since the nitrogen will be present as ammonium nitrogen, it will be held by the clay and humus in the soil until it can be converted to nitrate nitrogen. It is then gradually converted to nitrate nitrogen over a period of several weeks. Since nitrate nitrogen experiences the greater degree of loss, and since there is a decreased amount of nitrate nitrogen available, there is consequently a decreased loss of the nitrogen in the fertilizer through denitrification or through leaching. The result is an up to about 25 percent greater nitrogen efficiency. That is, there is an average of about a twenty-five percent increased utilization of the nitrogen that is applied to a field. In addition, there is also the factor that there is greater application flexibility. Since the nitrogen will remain in the soil and be available to the plant for a longer period of time, the fertilizer does not have to be applied to the plant in accordance with a rigorous schedule. In fact, in many instances the fertilizer can be applied once during the growing season and it will be available to the plant throughout the growing season. In addition this improved fertilizer is compatible with various herbicides which can be applied to the area in conjunction with the fertilizer.

BRIEF SUMMARY OF THE INVENTION

This new and improved nitrogen fertilizer is a homogeneous granular fertilizer composition. The total nitrogen content of the fertilizer compositions will be primarily provided by urea. The homogeneous granular fertilizer composition is comprised primarily of urea, dicyandiamide and ammonium thiosulfate. A phosphate can also be present. The phosphate compound is preferably an ammonium phosphate compound and most preferably an ammonium polyphosphate compound. The components of the fertilizer composition will be present in the amounts of about 90 to 98 percent by weight of urea, about 1.4 to 3.0 weight percent of dicyandiamide, and about 0.4 to 1.0 percent by weight of ammonium thiosulfate. A phosphate compound will be present in an amount of about 0.3 to 1.0 percent by weight when it is a part of the composition. The remainder of the composition will consist primarily of some moisture and urea synthesis byproducts. However, a herbicide, a dye, mineral micronutrients or other materials can also be incorporated into the granules and be a part of the fertilizer.

The granular fertilizer is produced from a urea melt. The dicyandiamide and ammonium thiosulfate are added to the urea while the urea is molten, preferably when the urea contains at least about 2 percent by weight of moisture, and most preferably at least about 4 percent by weight of moisture. Upon the addition of the dicyandiamide and ammonium thiosulfate they are readily dissolved in the molten urea. When a phosphate is also to be a part of the composition, such as an ammonium phosphate, it will also be added at this time. Also other additives such as conditioning agents, dyes and micronutrients will be added at this time or at a prior stage in processing the urea. In a preferred embodiment a portion of the molten urea is taken as a side stream and the ammonium thiosulfate, dicyandiamide, and other additives blended into this side stream. The side stream is then added to the main stream of the molten urea. After being added to the molten urea main stream the molten urea undergoes an evaporation to reduce the moisture content to less than about 1 percent by weight. The molten urea is then sprayed into a drum granulator. The fraction of particles between about 0.84 and 4.76 millimeters in diameter is recovered as product with the undersized product being directly recycled and the oversized product being crushed and recycled.

In use the granular fertilizer is applied to a field by means of a drop spreader or a broadcast spreader. In most instances it will be applied by means of a broadcast spreader.

DETAILED DESCRIPTION OF THE INVENTION

This present invention is directed to improved granular urea fertilizers. These fertilizers can be applied to a crop such as corn at the time of the planting of the corn and be available in the soil throughout the growth cycle of the corn plant. There is also up to about a 25 percent greater nitrogen efficiency and a significantly decreased exposure to loss of the nitrogen in the fertilizer from the time of application until the time of uptake by the plant. There is a resulting savings in the amount of fertilizer that has to be applied, a savings in the cost of applying the fertilizer, and a savings in the time required for multiple applications of the fertilizer to a field.

This granular fertilizer can also be effectively applied to turf. In turf usage the fertilizer stays in the area of the turf root system for a longer period of time and remains in a more usable form. The net result is a turf which has a controlled growth rate and which provides for a thicker overall turf. There is an improvement in quality without the need for as many applications as when other fertilizers are used.

The new and improved fertilizer compositions are urea based compositions. These urea based compositions will contain a quantity of dicyandiamide and ammonium thiosulfate homogeneously distributed throughout the composition. The composition can also contain a phosphate compound. When this is the case, the phosphate compound is preferably an ammonium phosphate and most preferably ammonium polyphosphate. The composition can also contain a conditioning agent, dyes and micronutrients. These are each homogeneously distributed throughout the fertilizer composition. The fertilizer composition will contain from about 90 to 98 percent by weight of urea, from about 1.4 to 3.0 percent by weight of dicyandiamide and from about 0.4 to 1.0 percent by weight of ammonium thiosulfate. A phosphate compound, when present, will be present in an amount of about 0.3 to 1.0 percent by weight of the fertilizer composition. The remainder of the composition will consist primarily of water and byproducts from the formation of urea, and optionally a dye and mineral micronutrients.

The ammonium thiosulfate component of the fertilizer composition will be added to the molten urea as an aqueous solution. A 40 to 70 percent by weight aqueous solution is used. Preferably about a 60 percent by weight aqueous solution is used. The remaining components will usually be added as solids.

In a preferred composition the fertilizer will contain about 96 percent by weight of urea, about 2.2 percent by weight of dicyandiamide, about 0.8 percent by weight of ammonium thiosulfate. When phosphate is present, it is preferred that it be in an amount of about 0.6 percent by weight.

The dicyandiamide functions in the fertilizer as a slow release source of nitrogen. When maintained in the ammonium nitrogen form the nitrogen remains bound to the humus and clay in the soil and will not be susceptible to loss. Consequently the dicyandiamide is available to the plant as a source of nitrogen for a longer period of time. When urea is converted to ammonium nitrogen some ammonia gas can be lost into the atmosphere. The ammonium thiosulfate component functions as a source of both nitrogen and sulfur and further functions to reduce the possibility of ammonia loss when urea converts to the ammonium form of nitrogen. The phosphate component of the fertilizer composition functions as a nutrient and as a holding agent in the soil for the dicyandiamide. The phosphate ion retards the breakdown in the soil of the dicyandiamide and thus extends the life of the dicyandiamide in the soil. The phosphate compound will also function to assist in reducing the free ammonia content in the fertilizer suspension.

This new homogeneous granulated fertilizer is formed through a urea melt technique. In this technique the dicyandiamide, ammonium thiosulfate and other components are added while the molten urea contains at least about 2 percent by weight moisture, and preferably more than about 4 percent by weight moisture. Preferably the molten urea will contain about 4 to 6 percent moisture when the dicyandiamide and ammonium thiosulfate are added. The phosphate compound, if one is to be added, would preferably be added at this same point of time. However, it could be added in a prior step before the urea is concentrated to the 94 to 96 percent level. Micronutrients, dyes and conditioning agents can also be added at this time. Usually the conditioning agents will be added at a point where the urea contains more moisture. Suitable conditioning agents are urea formaldehyde and calcium lignosulfonate. These conditioning agents decrease the hygroscopic nature of the fertilizer granules and increase the flowability of the granules.

In a preferred mode of synthesis the conditioning agent is added to the molten urea prior to the moisture content of the molten urea being decreased to about the 2 to 7 weight percent moisture content level. After the addition, the molten urea then undergoes an evaporation step to decrease the water content to about the 2 to 7 percent level. At this point a side stream of molten urea is taken from the mainstream and the dicyandiamide and ammonium thiosulfate are added. The ammonium thiosulfate is added as preferably about a 40 to 70 percent weight aqueous solution, and about a 60 weight percent aqueous solution. These components along with any dye or mineral micronutrients are added at this point. The phosphate component would also be added at this point if it is to be a part of the fertilizer. The dye is added merely to color the final granules so that they can be distinguished from other grades of fertilizer. After the addition the side stream of molten urea is added back to the mainstream of molten urea. This combined stream is then sent to an evaporator to reduce the moisture content to less than about 2 percent by weight and preferably to less than about 1 percent by weight. The molten urea is then sprayed into a tubular granule forming apparatus. The urea spray continually coats the fertilizer particles as they move from one end of the tubular apparatus to the other end. The granules exit the tubular granule forming chamber and are sized. Those that pass through a #20 Tyler Series sieve (about 0.84 millimeters in size) and stay on a #4 Tyler Series sieve (about 4.76 millimeters) are taken off as product. The undersized particles are recycled and the oversized particles are ground and then recycled. Either a batch or continuous process can be used. It is preferred to use a continuous process.

This fertilizer is applied using drop or broadcast spreaders. It is preferred to use broadcast spreaders. These spreaders apply a granular fertilizer to an area in a shorter period of time.

The invention will now be described in more detail with reference to the following examples.

EXAMPLE 1

This example sets forth a batch technique for making the present fertilizer.

1934 pounds of urea are loaded into a heated vat and heated to 133° C. to melt the urea. This urea has a moisture content of about 8 to 10 percent by weight. 8 pounds of urea formaldehyde conditioning agent are added and dissolved in the molten urea. The molten urea is then fed to an evaporator which reduces the moisture content to about 4 to 6 percent by weight. A portion of the molten urea is then extracted from the vat and 44 pounds of dicyandiamide added along with 14 pounds of ammonium thiosulfate as a 60 percent aqueous solution. The dicyandiamide and ammonium thiosulfate quickly dissolve and this molten urea now containing dicyandiamide and ammonium thiosulfate is added to the vat containing the molten urea. After mixing this molten urea, it is fed to evaporators which reduce the moisture content to less than about 1 percent by weight. The urea mixture is then cooled and sprayed into a granulator drum. Granules that are at least 0.84 millimeters in size and less than 8 centimeters in size are collected as product. The other granules are recycled or ground and recycled. The result is a homogeneous granular fertilizer with the dicyandiamide and ammonium thiosulfate uniformly distributed through each granule.

EXAMPLE 2

This example is directed to making the fertilizer composition of Example 1, but with the addition of phosphate.

The procedure of Example 1 is repeated, but along with the dicyandiamide and ammonium thiosulfate, there is added 15 pounds of ammonium polyphosphate. Upon the formation of granules the granules will contain an effective amount of phosphate.

EXAMPLES 3–16

This example provides a comparison of the fertilizer of Example 1 with other fertilizers with regard to usage on turf. The comparison is made with urea, ammonium nitrate, the commercial fertilizer Sulfur Kote and the commercial fertilizer Osmocote. In Table 1 there is set forth the fertilizer material, the pounds of nitrogen per 1000 $ft^2$ and the grams of material per 9 $ft^2$ plat. The legend (46-0-0) indicates 46 parts nitrogen, 0 parts potassium and 0 parts phosphate.

| Example | Nitrogen Rate (lb/N/1000 ft$^2$) | Nitrogen Source | gm/material/ 9 ft$^2$ Plot |
|---|---|---|---|
| 3. | 0 | None | 0 |
| 4. | 1 | Urea (46-0-0) | 8.88 |
| 5. | 2 | Urea (46-0-0) | 17.76 |
| 6. | 3 | Urea (46-0-0) | 26.64 |
| 7. | 4 | Urea (46-0-0) | 35.52 |
| 8. | 1 | Ex. 1 (46-0-0) | 8.88 |
| 9. | 2 | Ex. 1 (46-0-0) | 17.76 |
| 10. | 3 | Ex. 1 (46-0-0) | 26.64 |
| 11. | 4 | Ex. 1 (46-0-0) | 35.52 |
| 12. | | Urea (46-0-0) | 17.76* |
| 13. | 2 | Sulfur Kote (37-0-0) | 22.09 |
| 14. | 2 | Ammonium Nitrate | 24.77 |
| 15. | 2 | Osmocote (18-6-12) | 45.40 |
| 16. | | Urea (46-0-0) | 26.64** |

*two applications of 8.88 gms each
**three applications of 8.88 gms each

Table 2 sets forth its average color ratings with time. There is used a scale of 1 to 10. The greener the turf, the higher will be the value. (for instance 1=yellow; 2=acceptable green; 8=optimum green and 10=excessively green). It will be noted from Table 2 that the fertilizers of Example 1 provide for a greener turf over a longer period of time.

TABLE 2

Average Color Ratings With Time

| Example | Days After Treatment | | | | | | | | | |
|---|---|---|---|---|---|---|---|---|---|---|
| | 10 | 13 | 22 | 17 | 27 | 36 | 44 | 56 | 66 | 78 |
| 3 | 3.3 | 3.0 | 2.7 | 2.0 | 2.7 | 5.0 | 4.0 | 7.0 | 6.3 | 6.7 |
| 4 | 5.7 | 5.0 | 6.0 | 5.3 | 5.7 | 6.0 | 5.0 | 5.3 | 5.7 | 5.7 |
| 5 | 6.3 | 6.7 | 7.3 | 6.7 | 7.0 | 6.7 | 6.7 | 5.7 | 6.3 | 6.0 |
| 6 | 6.0 | 7.6 | 8.0 | 7.3 | 7.3 | 7.0 | 6.7 | 5.3 | 6.0 | 5.7 |
| 7 | 6.0 | 8.0 | 9.0 | 8.3 | 8.3 | 8.3 | 8.7 | 6.0 | 6.7 | 6.3 |
| 8 | 5.0 | 4.7 | 5.3 | 5.0 | 5.0 | 5.3 | 4.7 | 5.7 | 6.0 | 5.7 |
| 9 | 6.3 | 6.7 | 7.7 | 7.0 | 6.7 | 6.7 | 7.0 | 6.3 | 6.3 | 6.0 |
| 10 | 6.3 | 7.3 | 8.7 | 8.0 | 7.7 | 7.0 | 7.3 | 6.0 | 5.7 | 6.0 |
| 11 | 6.3 | 7.7 | 9.0 | 9.0 | 8.3 | 8.0 | 8.7 | 5.7 | 6.0 | 6.3 |
| 12 | 5.7 | 5.0 | 5.7 | 5.0 | 5.3 | 9.3 | 8.0 | 6.0 | 6.7 | 6.0 |
| 13 | 5.3 | 5.0 | 7.0 | 6.3 | 6.7 | 6.7 | 6.7 | 7.0 | 6.3 | 6.3 |
| 14 | 6.0 | 6.0 | 8.0 | 7.3 | 7.7 | 7.7 | 8.0 | 5.0 | 6.0 | 6.0 |
| 15 | 4.0 | 4.0 | 4.0 | 4.0 | 3.7 | 5.3 | 4.7 | 6.7 | 6.3 | 6.7 |
| 16 | 6.0 | 5.7 | 5.0 | 4.7 | 5.0 | 9.7 | 7.3 | 6.3 | 8.0 | 8.0 |

EXAMPLES 17-27

This example sets out a comparison of the use of the fertilizer of Example 1 with a number of other types of fertilizers as applied to corn. These tests were conducted in Kentucky, Illinois and Indiana. The fertilizer was applied at the rate of 140 pounds per acre. Each of the fertilizers was replicated nine times and the average of these replications taken. Table 3 sets forth the fertilizer utilized and the yield of corn in bushels per acre. All yields have been adjusted to 15.5 percent moisture corn. It is seen from Table 3 that the yields from the use of the fertilizer of Example 1 generally exceed the use of all other fertilizers.

TABLE 3

| EXAMPLE | FERTILIZER | AVERAGE YIELDS |
|---|---|---|
| 17 | Urea | 121.25 |
| 18 | Urea + DCD | 121.25 |
| 19 | Urea + DCD | 124.78 |
| 20 | Example 1 | 142.38 |
| 21 | Urea | 128.8 |
| 22 | Urea + ATS | 114.38 |
| 23 | Urea + ATS + APP | 111.88 |
| 24 | Example 1 | 125.21 |
| 25 | Urea | 117.83 |
| 26 | Urea + APP | 119.73 |

TABLE 3-continued

| EXAMPLE | FERTILIZER | AVERAGE YIELDS |
|---|---|---|
| 27 | Example 1 | 127.3 |

DCD = dicyandiamide; ATS = ammonium thiosulfate; APP = ammonium polyphosphate

EXAMPLE 28

This example sets forth a comparison of the use of urea at varied application levels and of the fertilizer of Example 1 at varied application levels on the growth of corn. The tests were conducted in Fayette County, Ohio, each application consisting of a number of replications of test plots. In these tests it was found that urea application at 140 pounds of nitrogen per acre yielded an average of 136 bushels per acre of corn, and at an application level of 210 pounds of nitrogen per acre the yield of corn was an average of 142 bushels per acre. In comparison the fertilizer of Example 1 when applied at a level of 140 pounds of nitrogen per acre yielded an average of 149 bushels per acre and when applied at a level of 105 pounds of nitrogen per acre yielded an average of 140 bushels. From these tests it is seen that the fertilizer of Example 1 will provide an average yield of corn in the range of that of corn using 35 pounds of nitrogen less per acre. This provides a savings in applied fertilizer. It also will cause less of the applied nitrogen to reach the aquifer as nitrate.

What is claimed is:

1. A homogeneous granulated fertilizer composition comprising as components about 90% to about 98% by weight urea, about 0.4% to 1.0% by weight ammonium thiosulfate and about 1.4% to about 3.0% by weight dicyandiamide, the foregoing components being in a homogeneous blend by said components being formed into granules from a melt of said urea component.

2. A homogeneous fertilizer composition as in claim 1 wherein said granules contain a conditioning agent.

3. A homogeneous fertilizer composition as in claim 2 wherein said conditioning agent is selected from the group consisting of urea formaldehyde and calcium lignosulfonate.

4. A homogeneous fertilizer composition as in claim 2 wherein said granules contain a dye.

5. A homogeneous fertilizer composition as in claim 1 wherein said granules have a particle size of from about 0.84 millimeters to about 4.76 millimeters.

6. A homogeneous fertilizer composition as in claim 1 wherein said urea is present in an amount of about 96% by weight, said ammonium thiosulfate is present in amount of about 0.8% by weight, and said dicyandiamide is present in an amount of about 2.2% by weight.

7. A homogeneous fertilizer composition as in claim 1 wherein said composition contains from about 0.3 to 1 percent by weight of $P_2O_5$.

8. A homogeneous fertilizer composition as in claim 1 wherein said $P_2O_5$ is present as an ammonium phosphate.

9. A method of enhancing the growth of plants by applying to the soil a homogeneous granulated fertilizer composition comprising about 90% to about 98% by weight urea, about 0.4% to about 1.0% by weight ammonium thiosulfate and about 1.4% to about 3.0% by weight dicyandiamide, the foregoing components being in a homogeneous blend by said components being formed into granules from a melt of said urea component.

10. A method as in claim 9 wherein said granules contain a conditioning agent.

11. A method as in claim 10 wherein said conditioning agent is selected from the group consisting of urea formaldehyde and calcium lignosulfonate.

12. A method as in claim 9 wherein said granules contain a dye.

13. A method as in claim 9 wherein said urea is present in an amount of about 96% by weight, said ammonium thiosulfate is present in an amount of about 0.8% by weight and said dicyandiamide is present in an amount of about 2.2% by weight.

14. A method as in claim 13 wherein phosphate is present in an amount of about 0.3 percent to 1.0 percent by weight.

15. A method as in claim 9 wherein said granules are in the particle size range of about 0.84 millimeters to about 4.76 millimeters.

16. A method for producing a homogeneous granulated fertilizer composition comprising:
  (a) providing urea in a molten condition and adding dicyandiamide and ammonium thiosulfate to said molten urea;
  (b) removing at least some of the contained moisture from the molten urea containing dicyandiamide and ammonium thiosulfate dissolved therein; and
  (c) forming said molten urea containing dicyandiamide and ammonium thiosulfate dissolved therein into granules, wherein said fertilizer composition comprises about 90% to about 98% by weight urea, about 0.4% to about 1.0% by weight ammonium thiosulfate, and about 1.4% to about 3.0% by weight dicyandiamide.

17. A method as in claim 16 wherein said ammonium thiosulfate is added to the molten urea as an aqueous solution.

18. The method as in claim 16 wherein said dicyandiamide and ammonium thiosulfate are added to a portion of molten urea which is then added to a larger portion of molten urea.

19. The method as in claim 16 wherein said molten urea has a moisture content of about 2 to 8 percent by weight when dicyandiamide and ammonium thiosulfate are added thereto.

20. A method as in claim 16 wherein a conditioning agent is added to said molten urea when said molten urea has a moisture content of greater than about 4 percent by weight.

21. A method as in claim 16 wherein a source of phosphate is added to said molten urea along with the dicyandiamide and ammonium thiosulfate.

22. A method as in claim 21 wherein said source of phosphate is an ammonium phosphate.

23. A method as in claim 16 wherein said granular fertilizer as produced contains about 96% by weight urea, about 2.2% by weight of dicyandiamide, and about 0.8% by weight of ammonium thiosulfate and less than about 1 percent by weight of moisture.

24. A method as in claim 23 wherein said granular fertilizer contains from about 0.3 percent to about 1 percent by weight of phosphate.

25. A method as in claim 23 wherein said granular fertilizer contains from about 0.2 percent to about 1 percent by weight of conditioning agent.

26. A method as in claim 16 wherein said granules have a particle size of about 0.84 millimeters to about 4.76 millimeters.

* * * * *

UNITED STATES PATENT AND TRADEMARK OFFICE
CERTIFICATE OF CORRECTION

PATENT NO.  : 4,994,100

DATED       : February 19, 1991

INVENTOR(S) : Sutton et al.

It is certified that error appears in the above-identified patent and that said Letters Patent is hereby corrected as shown below:

In the Abstract, line 1, "aqueous" should read --granular--.

column 1, line 59, "During fourth" should read --During the fourth--.

Column 2, line 64, "take" should read --taken--.

Column 4, line 43, "ureabased" should read --urea based--.

Column 6, line 42, "8 centimeters" should read --4.76 millimeters--.

Signed and Sealed this

Nineteenth Day of January, 1993

Attest:

DOUGLAS B. COMER

*Attesting Officer*   Acting Commissioner of Patents and Trademarks